United States Patent

Espindola et al.

[11] Patent Number: 6,085,016
[45] Date of Patent: Jul. 4, 2000

[54] MAGNETICALLY CONTROLLED VARIABLE OPTICAL ATTENUATOR

[75] Inventors: Rolando Patricio Espindola, New Providence; Sungho Jin, Millington; Hareesh Mavoori, Berkeley Heights; Kenneth Lee Walker, New Providence, all of N.J.

[73] Assignee: Lucent Technologies, Inc., Murray Hill, N.J.

[21] Appl. No.: 09/097,549

[22] Filed: Jun. 15, 1998

[51] Int. Cl.[7] ................................................... G02B 6/00
[52] U.S. Cl. ................................................ 385/140
[58] Field of Search .................................. 385/140, 137, 385/51, 25, 124, 33; 359/324, 228, 281, 283; 250/201.4, 341.6, 559.22; 356/351, 312, 51

[56] References Cited

U.S. PATENT DOCUMENTS

| | | | |
|---|---|---|---|
| 3,651,322 | 3/1972 | Elliot | 250/341.6 |
| 4,257,671 | 3/1981 | Barbaudy et al. | 385/51 |
| 4,261,640 | 4/1981 | Stankos et al. | 385/140 |
| 4,645,294 | 2/1987 | Oguey et al. | 385/140 |
| 4,701,021 | 10/1987 | Le Pesant | 359/228 |
| 5,097,119 | 3/1992 | Breitmeier | 250/201.4 |
| 5,812,304 | 9/1998 | Shirasaki et al. | 359/324 |
| 5,974,216 | 10/1999 | Nakaya | 385/140 |

*Primary Examiner*—Akm E. Ullah

[57] ABSTRACT

Magnets are used to control the amount of coupling loss between fibers. The fiber ends are attached to magnets and by controllably magnetizing the magnets, the fibers can be pulled apart or brought closer together to vary the amount of coupling loss. Preferably at least one of the magnets is latchable. The advantage of the latchable version is that a predetermined amount of loss can be latchably set by magnetizing the magnets to a particular level and afterwards no additional power is required to maintain the amount of attenuation. This is advantageous compared to other approaches in which power is required continuously to maintain a particular loss level.

8 Claims, 4 Drawing Sheets

MAGNETICALLY CONTROLLED VARIABLE OPTICAL ATTENUATOR

FIELD OF THE INVENTION

The present invention relates to optical attenuators and, in particular, to a magnetically controlled variable attenuator. The attenuator is particularly useful for in-line separation of two axially aligned optical fibers.

BACKGROUND OF THE INVENTION

Variable optical attenuators are becoming increasingly important in dense wavelength-division multiplexing (DWDM) optical fiber transmission systems. Variable attenuators are used to vary the amount of loss light experiences as it passes through the device, ranging from low loss (<1 dB) to very high loss (>30 dB). The loss mechanism for variable attenuators can be coupling loss between fibers, polarization loss, absorption loss, scattering loss, or any combination of these.

A variable attenuator based on coupling loss is typically composed of two fibers whose separation is controlled via mechanical motion. As the separation between fibers increases, the amount of loss also increases (see for example Benner et al., "Low-reflectivity in-line variable attenuator utilizing optical fiber tapers" *J. Lightwave Technol.*, Vol 18, p 7, 1990).

SUMMARY THE INVENTION

In accordance with the invention, magnets are used to control the amount of coupling loss between fibers. The fiber ends are attached to magnets and by controllably magnetizing the magnets, the fibers can be pulled apart or brought closer together to vary the amount of coupling loss. Preferably at least one of the magnets is latchable. The advantage of the latchable version is that a predetermined amount of loss can be latchably set by magnetizing the magnets to a particular level and afterwards no additional power is required to maintain the amount of attenuation. This is advantageous compared to other approaches in which power is required continuously to maintain a particular loss level.

BRIEF DESCRIPTION OF THE DRAWING

The advantages, nature and additional features of the invention will appear more fully upon consideration of the illustrative embodiments described in the accompanying drawings. In the drawings.

It is to be understood that these drawings are for purposes of illustrating the concepts of the invention and are not to scale. The same reference numerals are used to designate similar elements throughout the drawings.

DETAILED DESCRIPTION

Figure 1:
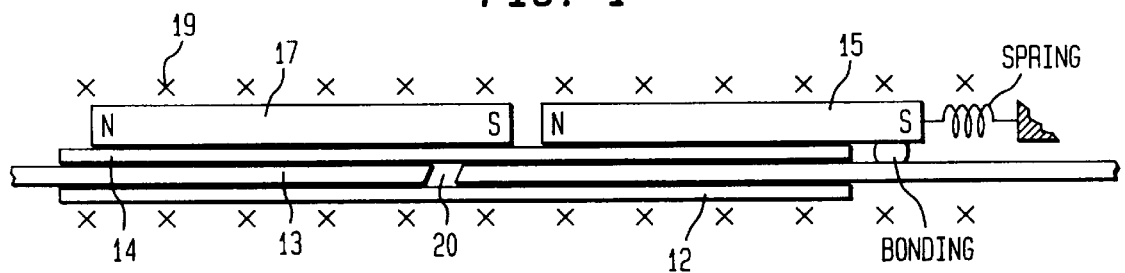
FIG. 1 schematically illustrates a magnetically controlled variable optical attenuator.

Referring to the drawing, FIG. 1 illustrates a variable optical attenuator 11 for varying the attenuation of light passing between two aligned light-carrying optical components 12 and 13, such as strands of optical fiber. The attenuator comprises a guide 14, such as a tube or v-groove, for maintaining the optical components 12, 13 in optical alignment. A first magnet 15 is mechanically coupled, as by bond 16, with a first optical component 12. The magnet 15 and the first component 12 are mobile with respect to the second component 13 along the guide 14.

A second magnet 17 is mounted stationary in relation to the guide 14 for moving the first magnet and thereby effectively moving the first component 12 in relation to the second component 13 along the guide. A resilient element 18, such as a spring, can be coupled to the first magnet 15 for mechanically biasing the magnet 15 in position and thereby defining an equilibrium separation 20 between components 12 and 13. Preferably the magnets 15, 17 are programmable via solenoid 19.

In operation, the magnets control the axial separation between the components 12, 13 thereby controlling the attenuation between them. Increasing the axial separation decreases the optical coupling efficiency leading to the desired attenuation. When the magnets 12, 13 (either both or only one) are subjected to an externally applied variable magnetic field by solenoid 19, their magnetizations are altered and hence the magnetic attractive or repulsive force between them is also altered. This force alters the separation between the magnets and between the optical components, causing variation in light attenuation.

For applications requiring non-latchable, continuously or frequently variable attentuation of the light signals, both magnetic components are preferably made up of soft magnetic materials with the coercive force in the operation direction (the direction of alignment) of less than 5 oersteads. For applications requiring less frequent variation of the attenuation, latchable magnetic components (at least one or both of the components) are desirable. For such latchable operation, the magnetic component desirably has programmable and easily reconfigurable magnetic properties as the applied field is altered, and also has a relatively square but controllably skewed M-H loop characteristic.

Figure 2A:
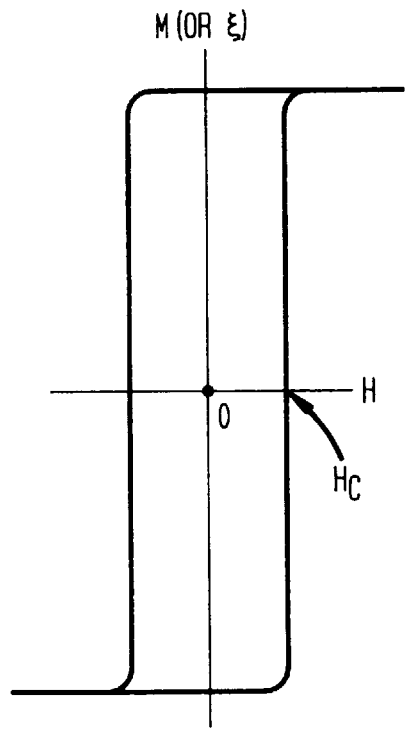
FIG. 2 schematically illustrates the relationship between the applied magnetic field and the latchable magnetization in the programmable magnet useful in an attenuator.
Figure 2B:
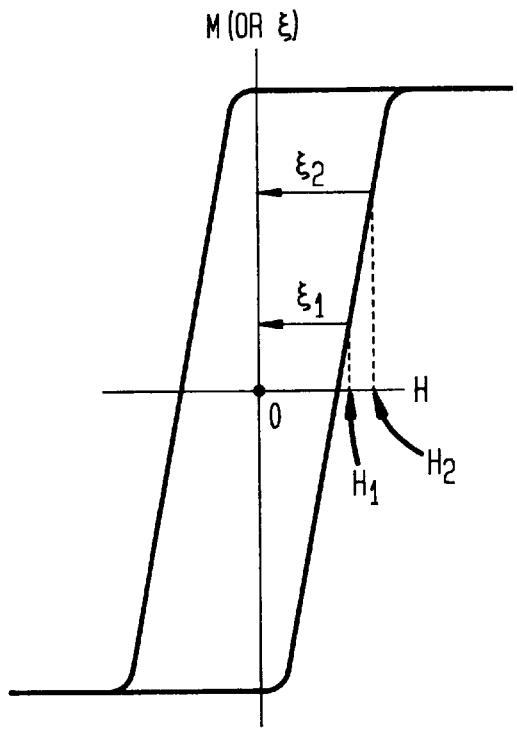
Figure 2C:
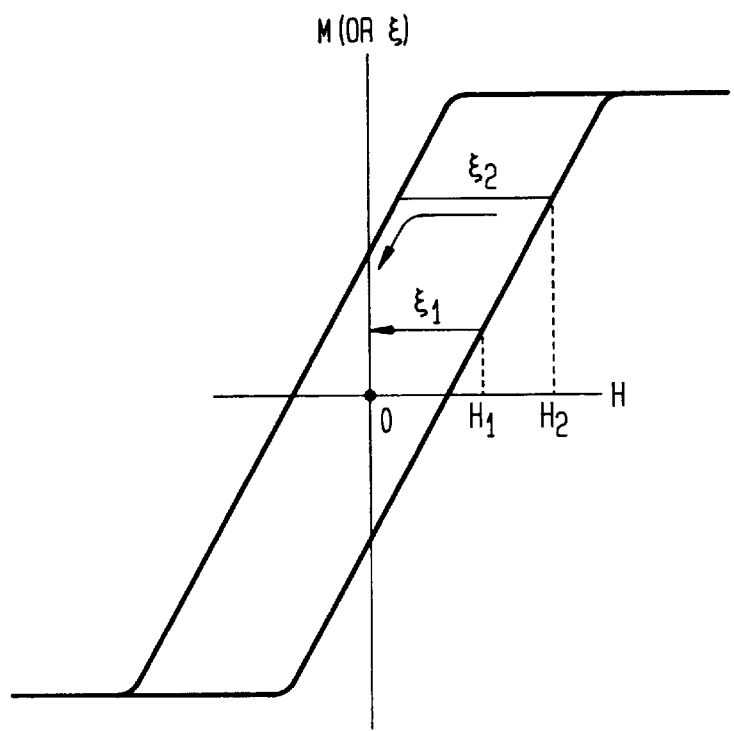

FIGS. 2(a)–2(c) show M-H loop characteristics useful in understanding the latchable operation of the device. With magnets exhibiting a square hysteresis loop, one can make bistable gap devices that switch between two attenuation levels, e.g., a base gap corresponding to zero magnetic force and a saturation gap achieved with the maximum magnetic force. The zero magnetic force is achieved by applying an AC or DC demagnetizing field. The maximum (saturation) gap is achieved by a DC pulse current sufficient to saturate the magnets. The advantage of the bistable device is the reduced sensitivity to the applied current or to a stray magnetic field.

For a continuous tuning of attenuation at various levels, the square loop characteristic of the inter-fiber gap vs applied magnetic field is not always desirable as the steep side of the curve in FIG. 2(a) can pose a control problem when a certain intermediate gap spacing ($\epsilon$) is aimed at, e.g., for obtaining various levels of attenuation of the optical signals. For ease of control, the M-H and $\epsilon$-H loop can be skewed as shown in FIG. 2(b). This is achieved by increasing the self-demagnetizing field of the magnets e.g., by either increasing effective diameter of the magnet or reducing the length and thus decreasing the magnet length-todiameter aspect ratio. The optimal skewing of the loop is as illustrated in FIG. 2(b), i.e., the remanent magnetization or the remanent inter-fiber gap spacing when the applied field is removed is still essentially the same as the saturation value (at least 90%) and the onset field of rapid decrease of M or ε when the field is reversed is near zero field and preferably in the range of ±50% the coercive force, even more preferably in the range of ±10% of the coercive force ($H_c$). In other words, the desired degree of skewing of the loop is preferably a maximum loop shift by 50%–150% of $H_c$. An excessive skewing of the M-H or ε-H loop as shown in FIG. 2(c) is not desirable as this causes a deterioration of the latchability of the inter-fiber gap spacing. Such a deterioration in latchable gap is indicated by arrows in FIG. 2(c).

An example of intentional loop skewing is set forth in U.S. patent application Ser. No. 09/020,206 filed by Espindola et al on Feb. 6, 1998. An Fe-28% Cr-7% Co alloy is deformation-aged to yield a square M-H loop with $H_c$ of 70 Oe, a dimension of 0.180" diameter and 4" length. The M-H Loop is skewed by ~60 Oe, producing a M-H loop similar to FIG. 2(b).

For applied magnetic fields of $H_1$ and $H_2$, the corresponding magnetization is latchably retained after the field is removed, and the corresponding separation between the two fibers, $\epsilon_1$ and $\epsilon_2$, is also latchably retained. Therefore the device can be operated without continuous power. To alter the degree of optical attenuation, the inter-fiber spacing is altered and latched by changing the magnetization in the programmable magnets. This can be achieved by either increasing the applied field or by demagnetizing first and remagnetizing to a new field level. For magnetization of the magnets using a solenoid, a pulse field (a pulse current in the solenoid) can conveniently be used for high-speed, low-power operation of the devices. The desired duration or speed of the pulse field is typically in the range of $10$–$10^{-6}$ seconds, preferably $10$–$10^{-4}$ seconds. The shape of the current pulse applied can be sinusoidal, rectangular or irregular.

The preferred magnet materials for the latchable attenuator devices are those whose magnetic properties are modifiable by a pulse magnetic field. Some examples of suitable magnets are Fe—Cr—Co, Fe—Al—Ni—Co (Alnico), Cu—Ni—Fe (Cunife), Co—Fe—V (Vicalloy), specially-processed, low-coercivity ($H_c$) rare earth cobalt (Sm—Co) or Nd—Fe—B magnets, and Ba-ferrite or Sr-ferrite magnets. The desired range of the coercivity for the programmable magnet is typically below 500 Oe and preferably below 100 Oe for the ease of programming by re-magnetization using solenoid pulse field. The coercivity is typically above 10 Oe and preferably above 30 Oe for maintaining the stability of the remanent magnetization and also for stability against demagnetization due to stray magnetic fields. For satisfactory latchability of inter-fiber gap when the field is removed, the programmable magnet should have a square magnetization hysteresis loop with the squareness ratio (remanent magnetization/saturation magnetization) of at least 0.85, preferably at least 0.90, even more preferably at least 0.95. For ease of control, the loop is desirably skewed by at least 50% of $H_c$. Mechanically ductile and easily formable or machineable magnet alloys such as Fe—Cr—Co, Cu—Ni—Fe, Co—Fe—V are particularly desirable for shaping into desired rod-like or tube-like geometry shown in FIG. 1. Stable permanent magnets with high coercive forces (e.g., $H_c$>1000 Oe), such as Sm—Co or Nd—Fe—B are less desirable (unless modified to exhibit lower coercive forces) because of the difficulty in reprogramming the remanent magnetization using desirably low magnetic fields. A non-programmable magnet, however, can be used as a mobile magnet, in combination with a stationary programmable magnet.

The mobile magnet can also be made of soft magnet materials. Exemplary soft magnet materials are Ni—Fe alloys (permalloys) such 80Ni-20Fe (wt %), 79Ni-17Fe-4Mo, 45Ni-55Fe, Fe-3% Si, soft ferrites such as Ni—Zn ferrite or Mn—Zn ferrite. These soft magnet materials generally have low $H_c$ of less than 10 Oe and high magnetic permeability of greater than 1000.

Figure 3:
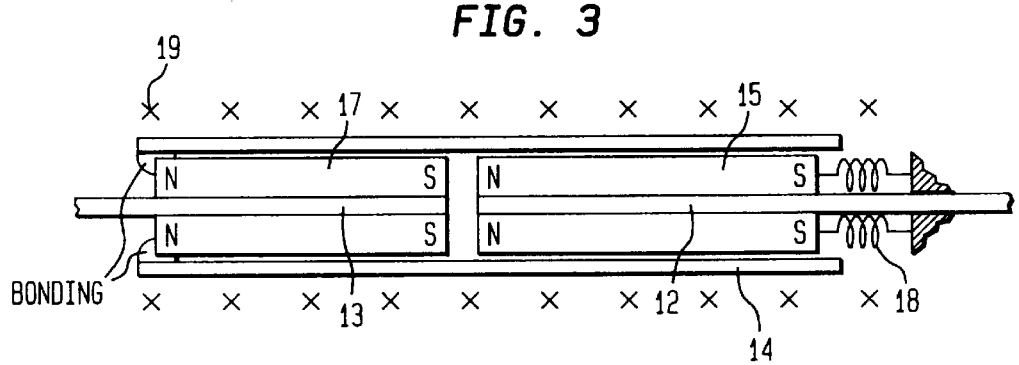
FIG. 3 shows a variation of the FIG. 1 embodiment.
Figure 4:
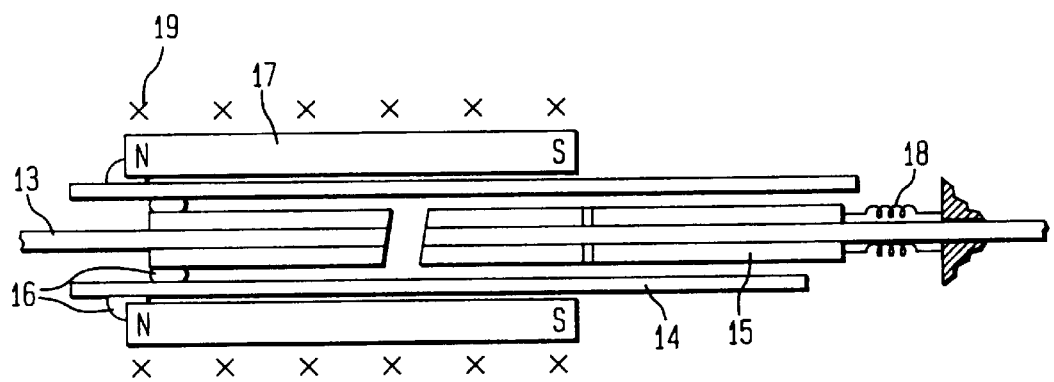
FIG. 4 is an alternative embodiment of the magnetically controlled optical attenuator.

The capillary or fiber-guiding tubes in FIGS. 1, 3 and 4 can be made of a variety of materials such as quartz, glass, metal or plastic. A low friction force between the capillary tube and the fiber (or magnetic component) is desired. A friction-reducing coating such as Teflon or DLC (diamond-like-carbon) may be applied to either the inside wall of the tube or the outside surface of the mobile component.

FIG. 3 shows a variation of the FIG. 1 embodiment wherein the magnets 15, 16 are disposed within the guide 14. In FIGS. 1 and 3, the two magnetic components are linearly or coplanarily arranged. The magnets can have rod, bar, plate, cylinder, or tube configurations.

In the FIG. 4 embodiment, the magnets with various possible configurations are non-coplanarily arranged, with the mobile magnetic component attached on or around the fiber or fiber assembly in the form of a ferrule shaped magnet. The ferrule magnet can be of the programmable type, permanent magnet type or soft magnet type. The ferrule magnet can be placed just outside the stationary magnet, or can be placed within the stationary magnet with the magnetic poles closely located for ease of magnetic attraction or repulsion.

The desired spring force to resiliently constrain the mobile magnetic component can be provided by utilizing a number of different means, for example, i) actual mechanical spring connecting the mobile magnet to a fixed position, the spring having a bent wire, strip, sheet or other configuration, ii) mechanical spring connecting the mobile magnet to the stationary magnet, iii) the spring force in a bent fiber itself, iv) the mobile magnet itself if it is thin enough for a portion of it to be bent and attached onto a fixed position or onto the stationary magnet, or v) a third magnetic component which exerts on the mobile magnet a repulsive or attractive force as a spring force.

For maximizing the magnetic force for a given volume of the magnet, the inter-fiber gap between the facing fiber ends should be very small. The magnetic force decreases as the inter-magnet gap is increased. The desired gap is less than about 80 mil, and preferably less than 20 mil and even more preferably less than 10 mil. It is preferable to set the gap so that the operable range of inter-fiber gap which is magnetically controlled is desirably in the range of 0–20 mil.

Figure 5:
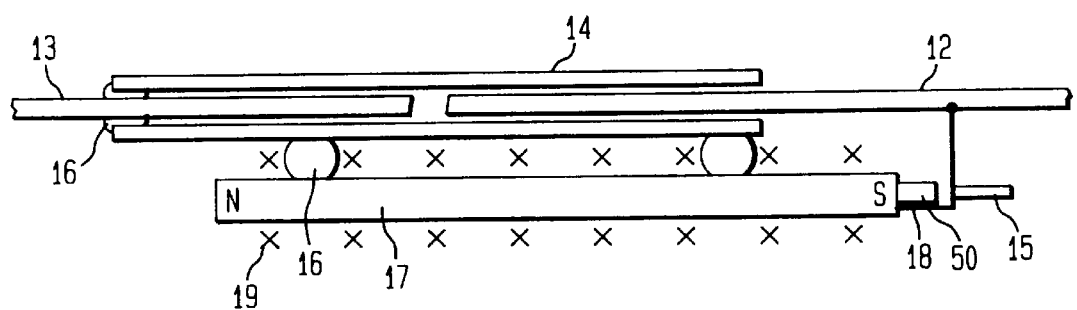
FIG. 5 is yet another embodiment of the magnetically controlled optical attenuator.

FIG. 5 shows an alternative attenuator assembly embodiment comprising a programmable magnet component 17 controlled by solenoid 19. The mobile magnetic component 15 is outside the solenoid. The mobile magnetic component 15 is attached onto a thin spring 18 (e.g., a bent resilient metal sheet of stainless steel or copper alloy) which is directly attached to the stationary magnet. The upper end of the spring is bonded to the mobile fiber (e.g. by epoxy). As the programmable magnet is magnetized to a desired level by the solenoid and the field removed, the mobile magnet is attracted toward the programmable magnet with a latchable displacement (repelled if the mobile magnet is a permanent magnet with an opposing magnet polarity). As shown in FIG. 5, the mobile fiber attached onto the spring is also moved to the left (to the right if the mobile magnet is operated in a repulsion mode), thus reducing the optical attenuation. An upper limit and lower limit movement stopper 50 may conveniently be placed to confine the movement of fiber within a safe operating range, e.g., without clashing to the stationary fiber or causing permanent plastic deformation of the spring component. The mobile magnet can be attached to the spring in a horizontal configuration (as shown in FIG. 5) or in a perpendicular or any inclined-angle configuration. Alternative embodiments such as using a permalloy strip as both the spring component and a mobile magnetic component can also be envisioned.

An important factor in assembly and operation of the in-line variable attenuator is the difficulty of accurate axial alignment of the two fiber cores in the capillary tube as the core size in a single-mode fiber is typically less than 10 μm. In order to enhance the alignment tolerances, the inventive devices optionally utilize light beam expanding components, for example, a GRIN lens (graded refractive index), an optical focusing lens, or a tapered fiber with a gradually increased fiber diameter near the end. Using such beam expanding components, the optical signals are expanded and then refocussed to increase the fiber alignment tolerance by at least a factor of two, and preferably by a factor of five.

Figure 6:
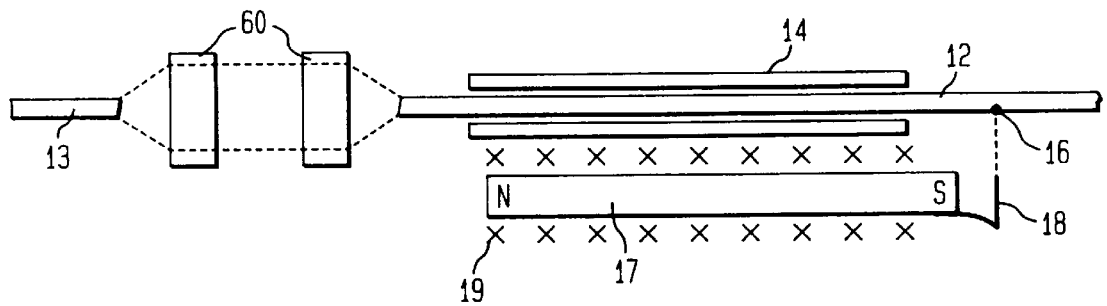
FIG. 6 is a schematic illustration of an attenuator additionally comprising light-broadening components.

The diagram of FIG. 6 illustrates an embodiment additionally comprising a light-broadening component 60 (such as a GRIN lens or tapered-up fiber) to improve the tolerance in axial alignment of the two optical components. Here, the spacing between one of the beam expanding components and one of the fibers (or alternatively the spacing between the two beam expanding components) is magnetically controlled.

Figure 7:
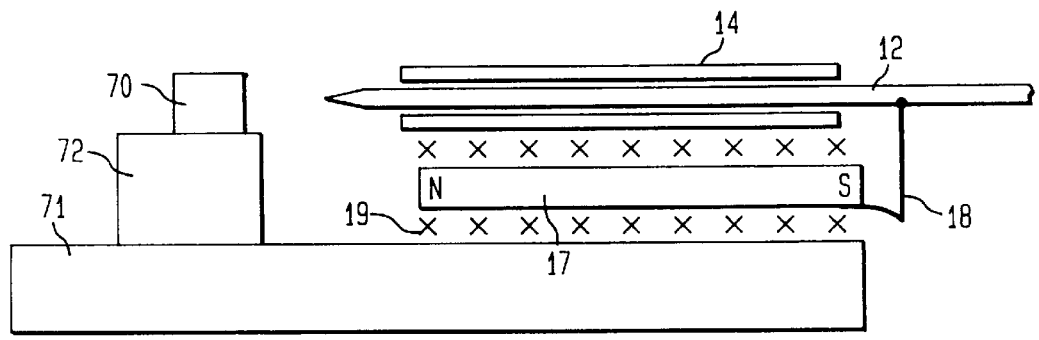
FIG. 7 represents another exemplary embodiment of the inventive attenuator comprising a laser element and an optical fiber element.

Shown in FIG. 7 is a magnetically controlled attenuator comprising a laser source 70 and an optical fiber 12. The spacing between the two optical components is magnetically controlled. For ease of assembly, the programmable magnet 17 as well as the fiber 12 and the capillary tube 14 can all be placed inside the solenoid if desired. Beam expanding components (not shown) can also be added for improved alignment tolerance. The laser 70 and attenuator can be disposed on a common substrate 71 with a support 72 to vertically align the laser with fiber 12.

The magnetically reconfigurable attenuator described here is also useful for making various other types of attenuators. For very high frequency operation (e.g., continuous, fast, or frequent attenuation at 10 MHz or higher) where the latchability may not be needed, magnetically soft material with minimal eddy current loss and ferromagnetic resonance loss is desirable. Either electrically insulating magnetic materials such as ferrites or high resistance materials such as amorphous or nanocrystalline magnetic materials are desired. For even higher frequency operations, magnetic materials preferably in a film form (and multi-layer laminated if needed for higher flux density) are preferred. In order to overcome the ferromagnetic resonance loss, soft magnetic films with high anisotropy field are generally desired.

It is to be understood that the above mentioned embodiments are illustrative of only a few of the many possible specific embodiments which can represent applications of the invention. Numerous and varied other arrangements can be made by those skilled in the art without departing from the spirit and scope of the invention.

What is claimed:

1. A variable optical attentuator for varying the attenuation of light passing between two light-carrying optical components comprising:

a guide for maintaining said optical components in optical alignment;

a first magnet mechanically coupled to a first of said optical components, said first magnet and said first optical component being mobile with respect to the second optical component along said guide; and a second magnet for moving said first magnet, said second magnet being stationary with respect to said guide, whereby said second magnet can effectively move said first component in relation to the second component along said guide.

2. The variable attenuator of claim 1 further comprising a resilient element coupled to said first magnet for mechanically biasing said first magnet in position.

3. The variable attenuator of claim 1 wherein at least one of said first and second magnets is a latchable magnet.

4. The variable attenuator of claim 1 wherein both of said first and second magnets are comprised of magnetic materials with the coercive force in the direction of optical alignment of less than 5 oersteads.

5. The variable attenuator of claim 1 further comprising a light beam expanding element disposed in the optical path between said two light-carrying optical components.

6. The variable attenuator of claim 1 wherein said two light-carrying components comprise lengths of optical fiber.

7. The variable attenuator of claim 1 wherein said two light carrying components comprise a laser and a length of optical fiber.

8. The variable attenuator of claim 7 further comprising a common substrate for supporting said laser and said fiber.

* * * * *